(12) United States Patent
Wada et al.

(10) Patent No.: US 9,998,701 B2
(45) Date of Patent: Jun. 12, 2018

(54) IMAGING DEVICE IN WHICH THE ELECTRIC POWER AND IMAGE SIGNAL TRANSMISSION CAN BE PERFORMED IN A NON-CONTACT BASIS

(71) Applicant: PANASONIC INTELLECTUAL PROPERTY MANAGEMENT CO., LTD., Osaka (JP)

(72) Inventors: Jyouji Wada, Kanagawa (JP); Yoshihito Urashima, Fukuoka (JP); Tamotsu Uchida, Kanagawa Ken (JP); Toshihisa Tsuda, Tokyo (JP); Hirohito Tsuruta, Osaka (JP); Masahumi Mizuno, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/316,991

(22) PCT Filed: May 11, 2015

(86) PCT No.: PCT/JP2015/002371
§ 371 (c)(1),
(2) Date: Dec. 7, 2016

(87) PCT Pub. No.: WO2015/194090
PCT Pub. Date: Dec. 23, 2015

(65) Prior Publication Data
US 2017/0104951 A1    Apr. 13, 2017

(30) Foreign Application Priority Data
Jun. 19, 2014  (JP) .................................. 2014-126607

(51) Int. Cl.
H04N 5/38      (2006.01)
H04N 5/225     (2006.01)
H02J 50/10     (2016.01)

(52) U.S. Cl.
CPC ............... H04N 5/38 (2013.01); H02J 50/10 (2016.02); H04N 5/2252 (2013.01)

(58) Field of Classification Search
CPC ...... H04N 5/2252; H04N 5/2253; H04N 5/38; H02J 50/10
See application file for complete search history.

(56) References Cited

U.S. PATENT DOCUMENTS 6,479,813 B2 * 11/2002 Takada ............. G08B 13/19619
250/215
2003/0194230 A1 * 10/2003 Tamura ............. G08B 13/1963
396/427
(Continued)

FOREIGN PATENT DOCUMENTS

JP    6-78185      3/1994
JP    11-298766    10/1999
(Continued)

OTHER PUBLICATIONS

International Search Report, along with English-language translation thereof, in PCT/JP2015/002371 dated Aug. 4, 2015.

*Primary Examiner* — Luong T Nguyen
(74) *Attorney, Agent, or Firm* — Greenblum & Bernstein, P.L.C.

(57) ABSTRACT

An imaging device in the present invention includes an imaging unit that images an image and an installation unit on which the imaging unit is removably installed. The installation unit houses a first contactless transmitter that transmits and receives at least one of a power and a signal in a non-contact basis. The imaging unit houses an axis portion, a second contactless transmitter, and transmits and receives
(Continued)

at least one of the electric power and the signal in a non-contact basis, and an imaging mechanism portion that is fixed to the other end portion of the axis portion in the side opposite to the installation unit side, and is connected to the second contactless transmitter via a transmission wire inserted through the axis portion. In this way, a watertproofness and a dustproofness can be improved, and thus, it is possible to improve a long-term reliability.

9 Claims, 8 Drawing Sheets

(56) References Cited

U.S. PATENT DOCUMENTS

| | | | | |
|---|---|---|---|---|
| 2008/0055409 | A1* | 3/2008 | Mars | G03B 37/02 |
| | | | | 348/143 |
| 2008/0181600 | A1* | 7/2008 | Martos | G03B 15/00 |
| | | | | 396/427 |

FOREIGN PATENT DOCUMENTS

| | | |
|---|---|---|
| JP | 2001-208055 | 8/2001 |
| JP | 2009-200750 | 9/2009 |

* cited by examiner

180
IMAGING DEVICE IN WHICH THE ELECTRIC POWER AND IMAGE SIGNAL TRANSMISSION CAN BE PERFORMED IN A NON-CONTACT BASIS

TECHNICAL FIELD

The present invention relates to an imaging device.

BACKGROUND ART

In the related art, an imaging device (a monitoring camera) is known, in which a camera main body unit is removably mounted on a ceiling of a building to facilitate a wiring work (refer to PTL 1).

As illustrated in FIG. 1, monitoring camera 501 includes main body side coaxial connector 507 and fixture side coaxial connector 509 for transmitting a video signal and receiving a control signal at the central part of camera main body unit 503 and fixture 505 respectively.

Monitoring camera 501 includes hook 511 and hook engaging portion 513 which can be removed by rotating camera main body unit 503 on a concentric circle around main body side coaxial connector 507 and fixture side coaxial connector 509.

Monitoring camera 501 supplies an electric power to camera main body unit 503 through hook 511 and hook engaging portion 513. Since wiring is performed with respect to fixture 505, power cord 518 and coaxial cable 517 for external connection are not connected to camera main body unit 503.

In the monitoring camera disclosed in PTL 1, since holes are provided on a predetermined position of the camera main body unit and the fixture, a watertproofness and a dustproofness are insufficient, and thus, the long-term reliability is insufficient.

CITATION LIST

Patent Literature

PTL 1: Japanese Patent Unexamined Publication No. 11-298766

SUMMARY OF THE INVENTION

An imaging device in the present invention includes an imaging unit that images an image and an installation unit on which the imaging unit is removably installed. The installation unit houses a first contactless transmitter that transmits and receives at least one of a power and a signal in a non-contact basis. The imaging unit houses an axis portion that is rotatably supported by a bearing fixed to the imaging unit, a second contactless transmitter that is fixed to an end portion of the axis portion in the installation unit side and faces the first contactless transmitter, and transmits and receives at least one of the electric power and the signal in a non-contact basis, and an imaging mechanism portion that is fixed to the other end portion of the axis portion in the side opposite to the installation unit side, and is connected to the second contactless transmitter via a transmission wire inserted through the axis portion. In this way, a watertproofness and a dustproofness can be improved, and thus, it is possible to improve a long-term reliability.

DESCRIPTION OF EMBODIMENT

Hereinafter, exemplary embodiments of the present invention will be described using the drawings.

Events that Leads to Exemplary Embodiments of the Present Invention

There is a camera that is rotatable in 360 degree in a monitoring camera so as to be able to image while rotating in various directions. In this type of monitoring camera, in order to avoid a limitation of rotation angle of the camera due to the winding of wires, a slip ring (a contact type slip ring) is used. The contact type slip ring includes a rotation terminal and an electrical contact. Plural stages of the rotation terminal are provided in a direction along an axis line of the rotation axis (for example, approximately 12 stages). The electrical contact is provided on the fixture and is in contact with each rotation terminal.

In the contact type slip ring, the number of normal operations is limited because of a complicated structure in which many mechanical contacts are included. Therefore, the long-term reliability of the monitoring camera has been insufficient.

Figure 1:
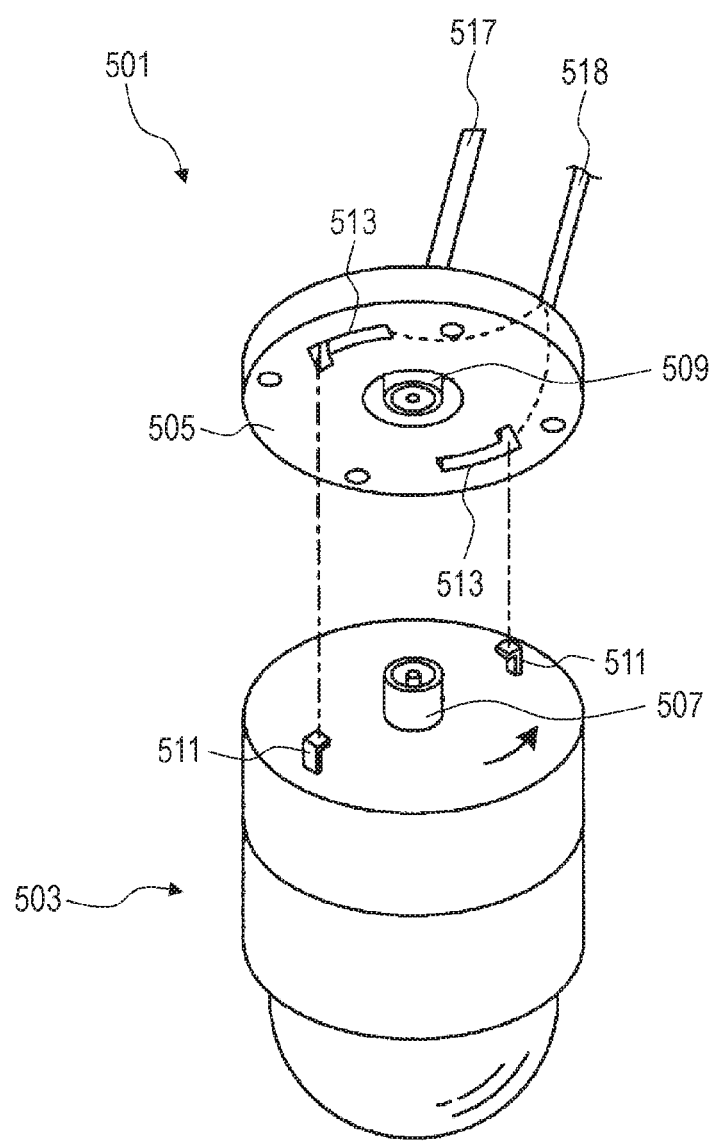
FIG. 1 is an exploded perspective view illustrating a structure of a monitoring camera in the related art.

In addition, monitoring camera 501 illustrated in FIG. 1 needs holes for providing hook engaging portion 513, main body side coaxial connector 507, and fixture side coaxial connector 509. Therefore, in monitoring camera 501, the watertproofness and the dustproofness have been insufficient.

Hereinafter, an imaging device will be described, in which the watertproofness and the dustproofness can be improved and thus, the long-term reliability can be improved.

First Exemplary Embodiment

Figure 2:
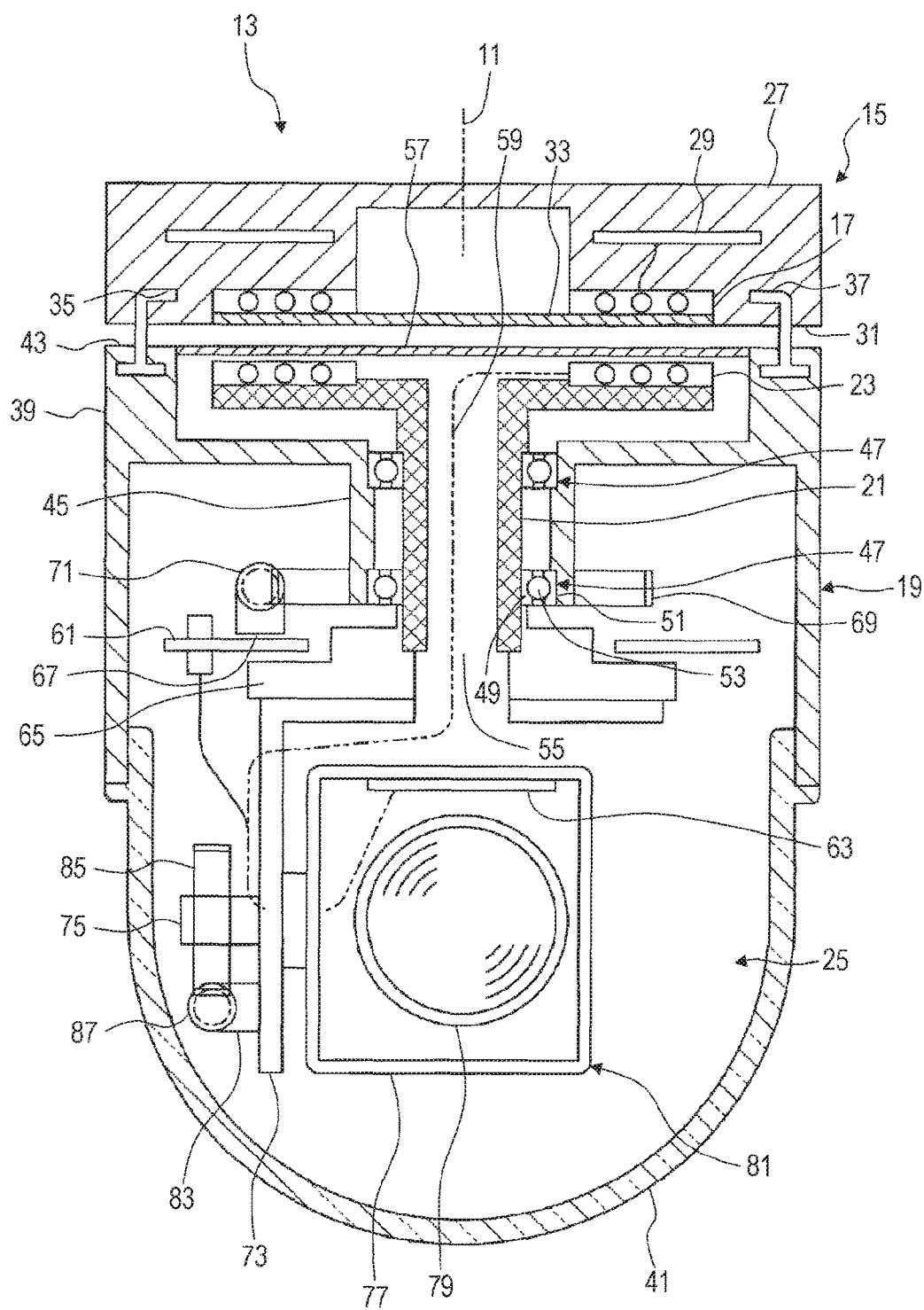
FIG. 2 is a sectional view illustrating an example of a structure of a monitoring camera in the exemplary embodiment.

FIG. 2 is a sectional view of monitoring camera 13 in the exemplary embodiment sectioned by a surface including central axis 11. Monitoring camera 13 includes installation unit 15, first coil 17, imaging unit 19, axis portion 21, second coil 23, and imaging mechanism portion 25. Monitoring camera 13 is an example of the imaging device. First coil 17 is an example a first contactless transmitter. Second coil 23 is an example of a second contactless transmitter.

Imaging unit 19 is removably mounted on installation unit 15. Installation unit 15 is covered by installation unit cover 27 formed, for example, in a flat cylindrical shape. Installation unit cover 27 is formed from resin, for example. Installation unit 15 is mounted on a mounting member such as a ceiling or a wall with central axis 11 being vertical. In a case of outdoor type specification described below, installation unit 15 is mounted on the mounting member (for example, mounting bracket).

For example, installation unit side board 29 is housed inside of installation unit 15. In installation unit side board 29, for example, a frequency modulation circuit, a video receiving circuit, a video demodulation circuit, an image signal processing circuit, and a power supply circuit are provided.

Installation unit 15 houses first coil 17. First coil 17 is formed in an annular shape, for example, with central axis 11 of installation unit 15 as a center. First coil 17 is arranged close to imaging unit facing surface 31 of installation unit 15. First coil 17 is covered in a watertight manner by installation unit side sealing lid 33 mounted on imaging unit facing surface 31. First coil 17 is connected to installation unit side board 29. First coil 17 transmits and receives at least one of the electric power and the signal without being in contact with second coil 23. For example, first coil 17 transmits and receives both the electric power and the signal.

In installation unit 15, a pair of locking holes 35 which is a component member with a mechanically removable structure is provided on imaging unit facing surface 31. The pair of locking holes 35 is formed in a curved groove shape at both ends of the circle-shaped imaging unit facing surface 31 in a diametrical direction. A below described locking hook 37 protruding from imaging unit 19 is engaged to locking hole 35. Since the inner side of locking hole 35 is closed, water or dust is suppressed from entering the installation unit 15 from locking hole 35.

Imaging unit 19 is removably mounted on installation unit 15. For example, imaging unit 19 is covered by imaging unit side cover 39 formed as a flat cylindrical shape and hemispheric-shaped translucent dome cover 41 connected to imaging unit side cover 39. Imaging unit side cover 39 is formed from resin, for example.

In imaging unit 19, a pair of locking hooks 37 which is a component member having a mechanically removable structure is provided on installation unit facing surface 43. A pair of locking hook 37 protrudes toward installation unit 15 on both ends of the circle-shaped installation unit facing surface 43 in the diametrical direction. For example, a locking claw that is inserted into locking hole 35 and locked by locking hole 35 is formed in the protruding tip of each locking hook 37 by imaging unit 19 rotating.

Cylindrical portion 45 having an axis same to the axis line of installation unit 15 is formed in imaging unit side cover 39. In the inside of cylindrical portion 45, rolling bearings 47 that is a pair of bearings are coaxially provided in the direction along the axis line.

Rolling bearing 47 may be any one of a radial bearing or thrust bearing. The radial bearing receives a load vertical to the axial center. The thrust bearing receives a load in the direction of the axial center. In the present exemplary embodiment, the radial bearing is used in the description.

Rolling bearing 47 may be any one of a ball bearing or a roller bearing. In the present exemplary embodiment, the ball bearing is used in description. Rolling bearing 47 is configured to include bearing rings (inner ring 49 and outer ring 51), rolling body (ball 53), and a cage (not illustrated). Rolling bearing 47 may be a slide bearing which does not have the rolling body and in which an axis and the bearing are in sliding contact each other.

Rolling bearing 47 rotatably supports axis portion 21 in the inside of cylindrical portion 45. In the present exemplary embodiment, transmission wire insertion path 55 passes through axis portion 21 in the direction along central axis 11. That is, in rolling bearing outer ring 51 is fixed to cylindrical portion 45. Axis portion 21 is fixed to inner ring 49 that rotates relatively to outer ring 51. Installation unit 15 and axis portion 21 are arranged, for example, on the same axis. That is, axis portion 21 is fixed to inner ring 49 of rolling bearing 47, and rolling bearing 47 is coaxial with central axis 11 of first coil 17 and outer ring 51 is fixed to imaging unit 19. In axis portion 21 fixed to inner ring 49, both ends in the direction of axis line protrude from openings of both sides of cylindrical portion 45.

In monitoring camera 13, for example, an outer diameter of outer ring 51 of rolling bearing 47 is shorter than an outer diameter and an inner diameter of second coil 23 formed in an annular shape. In this way, rolling bearing 47 having comparatively short diameter can be selected, and thus, it is possible to reduce the component cost compared to the case of a long diameter (the diameter longer than the outer diameter of second coil 23).

Second coil 23 is fixed to one end portion of axis portion 21 in installation unit 15 side. Second coil 23 is formed in annular shape with the axis line of axis portion 21 as a center. Second coil 23 is arranged close to installation unit facing surface 43 in imaging unit 19. Second coil 23 is covered in a watertight manner by imaging unit side sealing lid 57 mounted on installation unit facing surface 43.

Transmission wire 59 is connected to second coil 23. Transmission wire 59 is, for example, inserted through transmission wire insertion path 55 of axis portion 21, and is connected to motor drive board 61, and camera board 63 provided on imaging mechanism portion 25.

Transmission wire 59 includes a power line in which a power line communication (PLC) signal is superimposed on a power source signal. Transmission wire 59 includes a signal line for the Power over Ethernet (PoE) in which, for example, a power source signal is superimposed on the Ethernet® signal.

For example, a demodulation circuit, a camera control circuit and a video modulator are provided in motor drive board 61 or camera board 63. Second coil 23 is coaxially facing first coil 17 and housed in imaging unit 19, and transmits and receives at least one of the electric power or the signal in a non-contact basis with first coil 17. For example, second coil 23 transmits and receives both the electric power and the signal.

Imaging mechanism portion 25 is fixed to another end portion in the side opposite to installation unit 15 side of axis portion 21, and housed in imaging unit 19. That is, imaging mechanism portion 25 rotates integrally with axis portion 21 together with second coil 23.

A central part of axis portion 21 is supported on cylindrical portion 45 by rolling bearing 47. In imaging mechanism portion 25, for example, motor drive board 61 and camera board 63 are connected to second coil 23 through transmission wire 59 inserted into axis portion 21.

Imaging mechanism portion 25 includes camera bracket 65 fixed to axis portion 21. Motor drive board 61 is fixed to camera bracket 65. For example, pan axis motor 67 is coaxially fixed to motor drive board 61 or camera bracket 65. On the other hand, for example, pan axis worm wheel 69 is fixed to the outer periphery of cylindrical portion 45. For example, pan axis worm gear 71 engaged in pan axis worm wheel 69 is fixed to a drive axis of pan axis motor 67.

Therefore, when pan axis motor 67 operates and pan axis worm gear 71 at the drive axis rotates, pan axis worm gear 71 turns around the outer periphery of pan axis worm wheel 69 while rotating. In this way, camera bracket 65 turns (pan turning) with central axis 11 (pan axis) of axis portion 21 as a center. The pan turning enables camera bracket 65 to turn in plural times of 360-degree turning (endless turning).

Camera support plate 73 is fixed to camera bracket 65. Tilt axis 75 is rotatably supported by camera support plate 73 in a direction orthogonal to axis portion 21. Similarly to axis portion 21, tilt axis 75 is also supported by a rolling bearing or the like (not illustrated). Camera unit 81 including camera 77, camera board 63, and lens mechanism 79 is fixed to one end of tilt axis 75.

Tilt axis motor 83 is fixed to camera support plate 73. On the other hand, tilt axis worm wheel 85 is coaxially fixed to another end of tilt axis 75. Tilt axis worm gear 87 engaged in tilt axis worm wheel 85 is fixed to a drive axis of tilt axis motor 83.

Therefore, when tilt axis motor 83 operates and tilt axis worm gear 87 at the drive axis rotates, tilt axis worm wheel 85 rotates. In this way, camera unit 81 rotates while tilting (rotates in a dip angle and elevation angle direction) together with tilt axis 75 fixed to tilt axis worm wheel 85. The tilting rotation angle is, for example, smaller than 180°.

Next, an overview of an electrical configuration example of monitoring camera 13 will be described.

For example, monitoring camera 13 is connected to a computer in a monitoring room via a network. Installation unit side board 29 is connected to an external power source, and the electric power is supplied thereto. A frequency modulation circuit of installation unit side board 29 superimposes the camera control signal from the computer on the electric power waveform of the wireless power supply. Camera control signal includes a signal for controlling monitoring camera 13.

Second coil 23 provided in imaging unit 19 receives the electric power and the signal using the electromagnetic induction action between, for example, second coil 23 and first coil 17 provided on installation unit 15. For example, the demodulation circuit on camera board 63 demodulates the camera control signal superimposed on the electric power waveform of the wireless power supply. The camera control circuit on camera board 63 outputs various control signals (for example, PTZ signals) of camera 77 based on the demodulated camera control signal. The PTZ signal includes a signal that controls at least one of panning (P), tilting (T), and zooming (Z).

Camera 77 converts a light received via an optical element using an imaging element, and sends the result as image data. The image data sent from camera 77 is sent to the video modulator on camera board 63. The image data modulated to the video signal is sent to first coil 17 via, for example, second coil 23.

First coil 17 is connected to the video receiving circuit on installation unit side board 29. Video receiving circuit is connected to video demodulation circuit. The video demodulation circuit demodulates the video signal from video receiving circuit to the image data. The demodulated image data is processed to data for image displaying by, for example, the image signal processing circuit on installation unit side board 29.

Next, an operation example of monitoring camera 13 will be described.

For example, in the computer in the monitoring room, a camera control signal including the instruction for the PTZ operation is generated by operating the operation unit (not illustrated) (for example, a joystick) or by an automatic tracking function. The computer sends the camera control signal to monitoring camera 13 via the network. For example, the camera control signal is sent to installation unit side board 29 of installation unit 15.

The frequency modulation circuit on installation unit side board 29 performs a frequency conversion on the camera control signal, and superimposes the result on the electric power waveform of the wireless power supply. A signal including the camera control signal and the electric power (power source signal) is transmitted to imaging unit 19 from installation unit 15 via first coil 17 and second coil 23.

In imaging unit 19, for example, the demodulation circuit on camera board 63 demodulates the camera control signal. In addition, for example, a rectifier circuit on camera board 63 converts the electric power signal from AC (alternating current) to DC (direct current) and the result is sent to motor drive board 61 and camera board 63.

For example, the central processing unit (CPU) mounted on camera board 63 sends a camera control signal for performing predetermined operations to camera 77. Camera 77 operates the PTZ operation according to the camera control signal. Camera 77 may perform, for example, a correction (for example, a white balance correction or a gamma correction) of the image data according the camera control signal.

When imaging the image, camera 77 sends the image data to the camera control circuit on camera board 63. The video modulator in imaging unit 19 converts the image data to a video signal. The image data converted to the video signal is transmitted to installation unit 15 via second coil 23 and first coil 17. The image data sent to installation unit side board 29 in installation unit 15 is demodulated by the video signal demodulation circuit. The demodulated image data is processed in various ways and the result is sent to the computer in the monitoring room via the network and is displayed on a monitor screen.

Next, a monitoring camera in a comparison example and in a modification example will be described.

Figure 3:
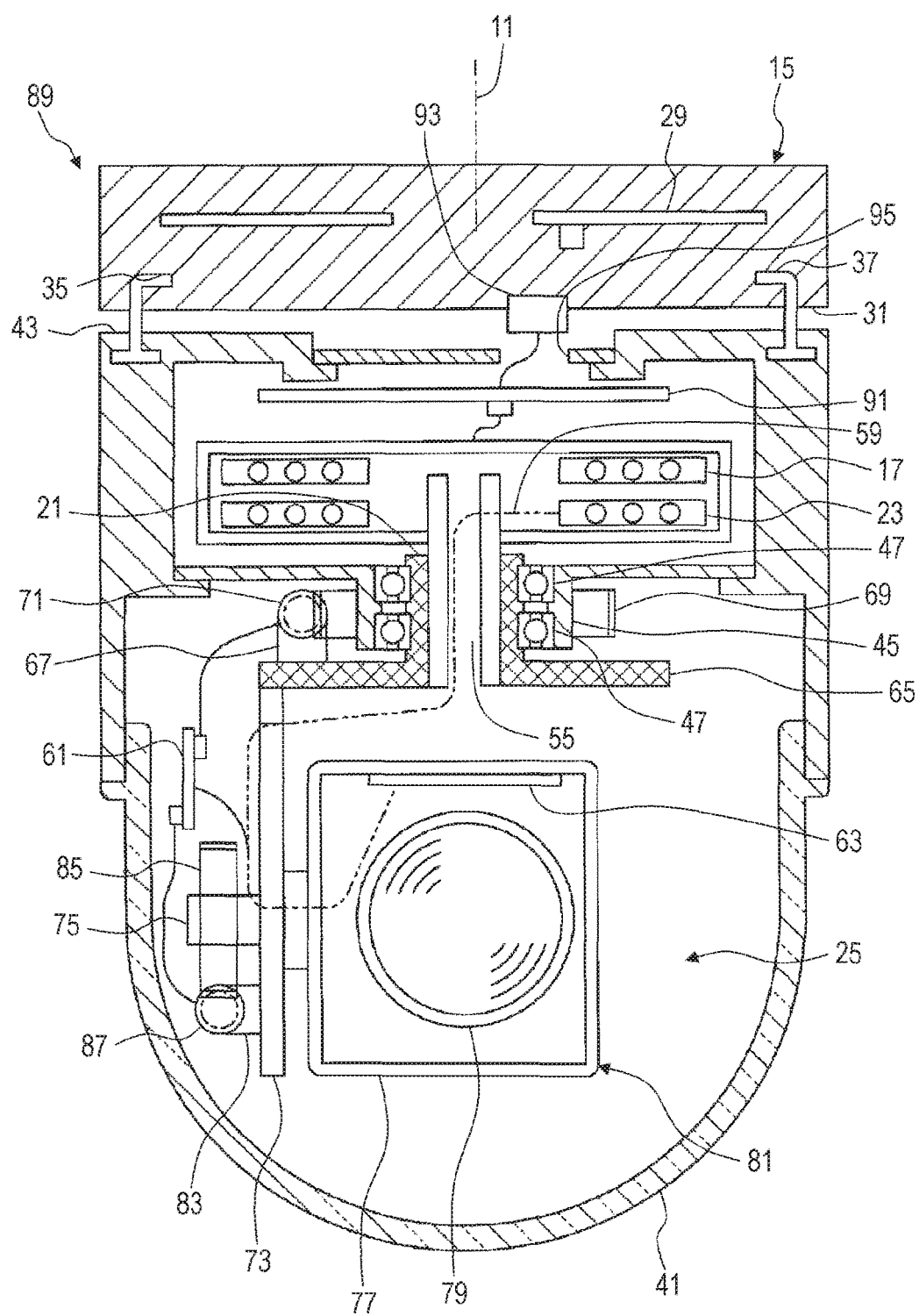
FIG. 3 is a sectional view illustrating a structure of a monitoring camera in a comparison example.

FIG. 3 is a sectional view illustrating a structure of the monitoring camera in the comparison example. In the comparison example and the modification example described below, the same reference marks will be given to the same members illustrated in FIG. 2, and the descriptions thereof will be omitted or simplified.

In monitoring camera 89 in the comparison example, both first coil 17 and second coil 23 are provided in imaging unit 19. First coil 17 is fixed to imaging unit 19 at the imaging unit side cover 39 side. Second coil 23 is fixed to axis portion 21. Therefore, in imaging unit 19, imaging mechanism portion 25 fixed to axis portion 21 transmits and receives the electric power and the signal between second coil 23 and first coil 17 via second coil 23 in non-contact basis.

In monitoring camera 89, first coil board 91 is arranged on installation unit 15 side of first coil 17 and second coil 23. First coil board 91 is connected to installation unit side board 29 of installation unit 15 via connector 93. In order for this, hole for electric wire 95 connected to connector 93 is bored on installation unit side sealing lid 33. Therefore, in monitoring camera 89, the watertproofness and the dustproofness in the mounting and removing portion of installation unit 15 and imaging unit 19 become insufficient, and thus, the long-term reliability deteriorates.

Next, operations of monitoring camera 13 will be described.

In monitoring camera 13, first coil 17 is housed in installation unit 15 mounted on the mounting member such as a ceiling, a wall, or a mounting bracket. First coil 17 transmits and receives at least one of the electric power and the signal in a non-contact basis. Imaging unit 19 is removably mounted on installation unit 15 in a mechanically removable structure.

In imaging unit 19, rolling bearing 47 is mounted coaxially with central axis 11 of first coil 17. In rolling bearing 47, inner ring 49 (inner race) is relatively rotatable with respect to outer ring 51 (outer race) via a rolling body (for example, ball 53 or a cylinder roller) supported by a cage. Outer ring 51 of rolling bearing 47 is fixed to imaging unit 19. Axis portion 21 is fixed to inner ring 49 of rolling bearing 47. That is, imaging unit 19 mounted on installation unit 15 rotatably supports axis portion 21 via rolling bearing 47.

Second coil 23 is fixed to one end portion of axis portion 21 at installation unit 15 side. Second coil 23 integrally rotates together with axis portion 21. Second coil 23 is coaxially arranged facing first coil 17 with a gap. Second coil 23 transmits and receives at least one of the electric power and the signal to and from first coil 17 with a gap in a non-contact basis.

Imaging mechanism portion 25 is fixed to another end portion at the side opposite to installation unit 15 in the axis portion 21 on which second coil 23 is mounted. Imaging mechanism portion 25 also integrally rotates together with axis portion 21. Imaging mechanism portion 25 includes camera 77 and enables the camera 77 to perform the PTZ operation. Camera 77 of imaging mechanism portion 25 and the driving member (for example, pan axis motor 67 and tilt axis motor 83) is electrically connected to second coil 23 via transmission wire 59. Various signals (for example, a power source signal, a control signal, and a video signal) are transmitted and received to and from first coil 17 and second coil 23 in a non-contact basis via second coil 23 connected to the driving member by wire.

Since the contact type slip ring has a complicated structure including many mechanical contact points, the number of normal operations is limited. On the contrary, in monitoring camera 13 in which first coil 17 and second coil 23 are arranged to face each other in a non-contact basis, a contact wear in a case of using the slip ring is not generated, and thus, the reliability in transmission and reception of the signal and the electric power can be improved. As a result, the limit of the number of operations caused by the mechanical contact points can be eliminated.

That is, according to monitoring camera 13, the endless turning is possible without using the slip ring in the related art. Therefore, it can also be said that first coil 17 and second coil 23 form a non-contact type slip ring.

In addition, the contact type slip ring has a wear resistance and it is needed to fix plural number of rotation terminals having smooth electrical contact surface along the rotation axis with a high accuracy. Therefore, the cost increases. On the contrary, according to monitoring camera 13, since the slip ring is not used, the manufacturing cost of monitoring camera 13 can be decreased.

In addition, in monitoring camera 13, transmission wire 59 connecting second coil 23 and imaging mechanism portion 25 is inserted through axis portion 21 and integrally rotates together with axis portion 21. Therefore, a deviation in transmission wire 59 is not generated by any arbitrary rotations of imaging unit 19, and thus, a twisting and a tangling can be suppressed. As a result, a durability of transmission wire 59 can be improved, and thus, it is possible to improve the long-term reliability of monitoring camera 13.

In addition, in monitoring camera 13, since installation unit 15 and imaging unit 19 which are sealed respectively are integrally mounted, first coil 17 and second coil 23 are arranged facing to each other with the gap. In this way, first coil 17 and second coil 23 transmits and receives at least one of the electric power and the signal in a non-contact basis in the relative rotation portion, and additionally, act as a non-contact connector that connects installation unit 15 and imaging unit 19 in a non-contact basis.

In addition, in monitoring camera 13, each of installation unit 15 and imaging unit 19 are completely sealed by, for example, a cover. Therefore, installation unit 15 and imaging unit 19 does not need connector 93 in the comparison example, and thus, it is possible to make the state of no holes. In this way, even if installation unit 15 and imaging unit 19 are separated, for example, the water drops, the dirts, or the dusts cannot enter because installation unit 15 and imaging unit 19 are covered by, for example, the cover. Therefore, the watertproofness and the dustproofness of monitoring camera 13 can be improved, and thus, the long-term reliability can be improved.

In addition, in monitoring camera 13, the outer diameter of outer ring 51 is shorter than the outer diameter of second coil 23. That is, rolling bearing 47 is formed with the outer diameter shorter than at least that of second coil 23. In addition, the outer diameter axis portion 21 can be made short in such an extent that the transmission wire 59 can be inserted through and a strength can be ensured, which enables to support imaging mechanism portion 25. The outer diameter of rolling bearing 47 can be made short corresponding to axis portion 21, and thus, it is possible to reduce the diameter of rolling bearing 47. In this way, a cheep rolling bearing 47 can be selected, and thus, the cost of monitoring camera 13 can be reduced.

In addition, recent years, the monitoring camera is in the trend of high resolution, and there is a case where an amount of information of the camera image is very large. According to monitoring camera 13, since the communication is performed in a non-contact basis between first coil 17 and second coil 23, the transmission error due to the contact resistance can be suppressed compared to the case of the contact type slip ring, and thus, the transmission speed can be highly improved. Therefore, it is possible to improve the communication quality between installation unit 15 and imaging unit 19.

Next, monitoring camera 13 in a modification example will be described.

Figure 4:
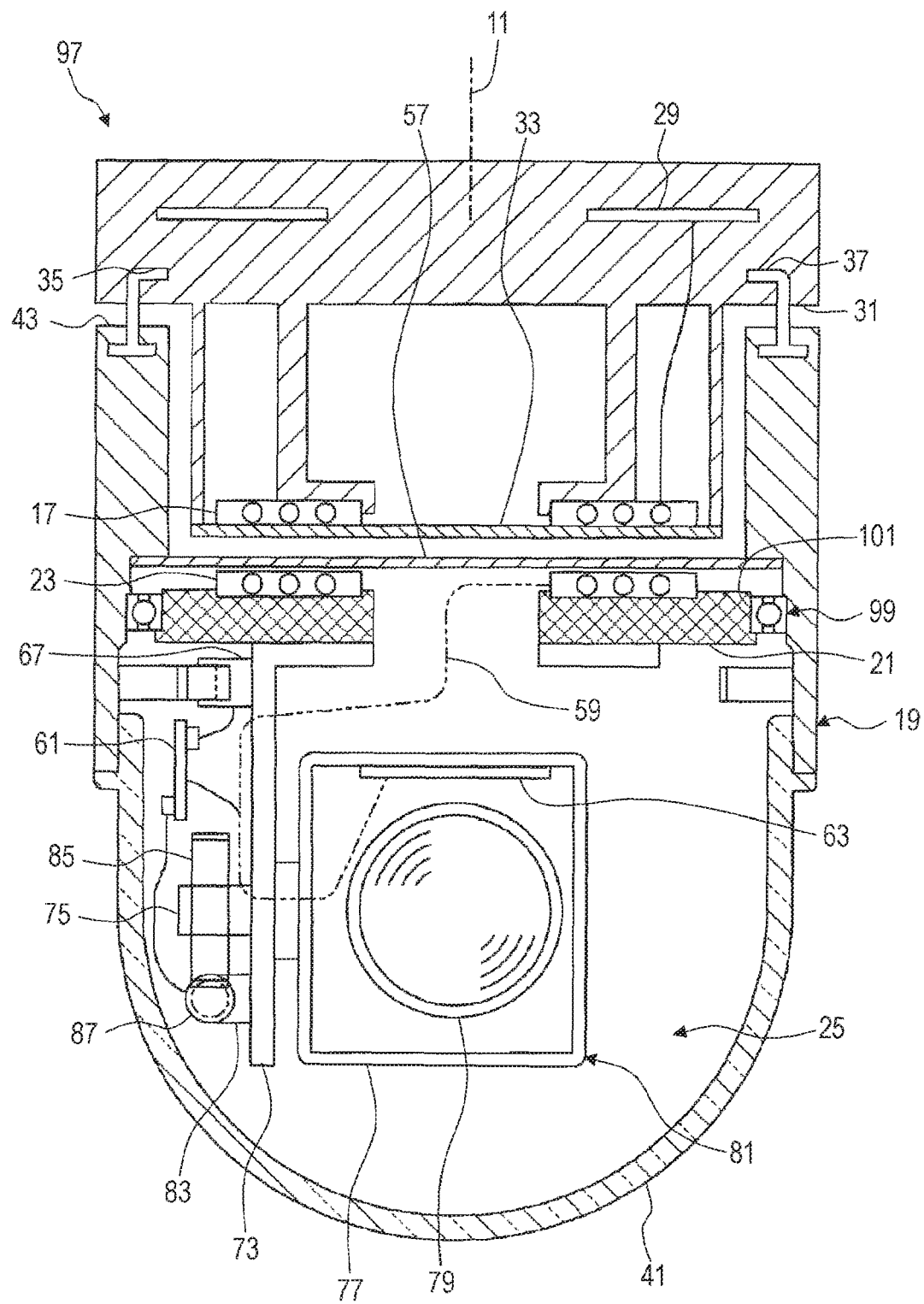
FIG. 4 is a sectional view illustrating a structure of a monitoring camera in a modification example.

FIG. 4 is a sectional view of monitoring camera 97 in the modification example. In monitoring camera 97, the inner diameter of inner ring 101 of rolling bearing 99 is longer than the outer diameter of second coil 23. Axis portion 21 is fixed to camera support plate 73 and plays the role of camera bracket 65 in FIG. 2.

In monitoring camera 97, second coil 23 can be arranged at the position of a radial inside of inner ring 101 of rolling bearing 99. In this way, second coil 23 and rolling bearing 99 can be arranged adjacent to each other in the direction along central axis 11, or on the same plane. As a result, a distance in imaging unit 19 (height in FIG. 4) in the direction along central axis 11 can be shortened (lowered). In addition, since the diameter of rolling bearing 99 is short, when axis portion 21 rotates, a blur (a position deviation between imaging unit 19 and axis portion 21) becomes small, and thus, the strength of axis portion 21 can be increased.

Next, an example of a case will be described, where monitoring camera 13 in the exemplary embodiment is made as an outdoor type.

Figure 5:
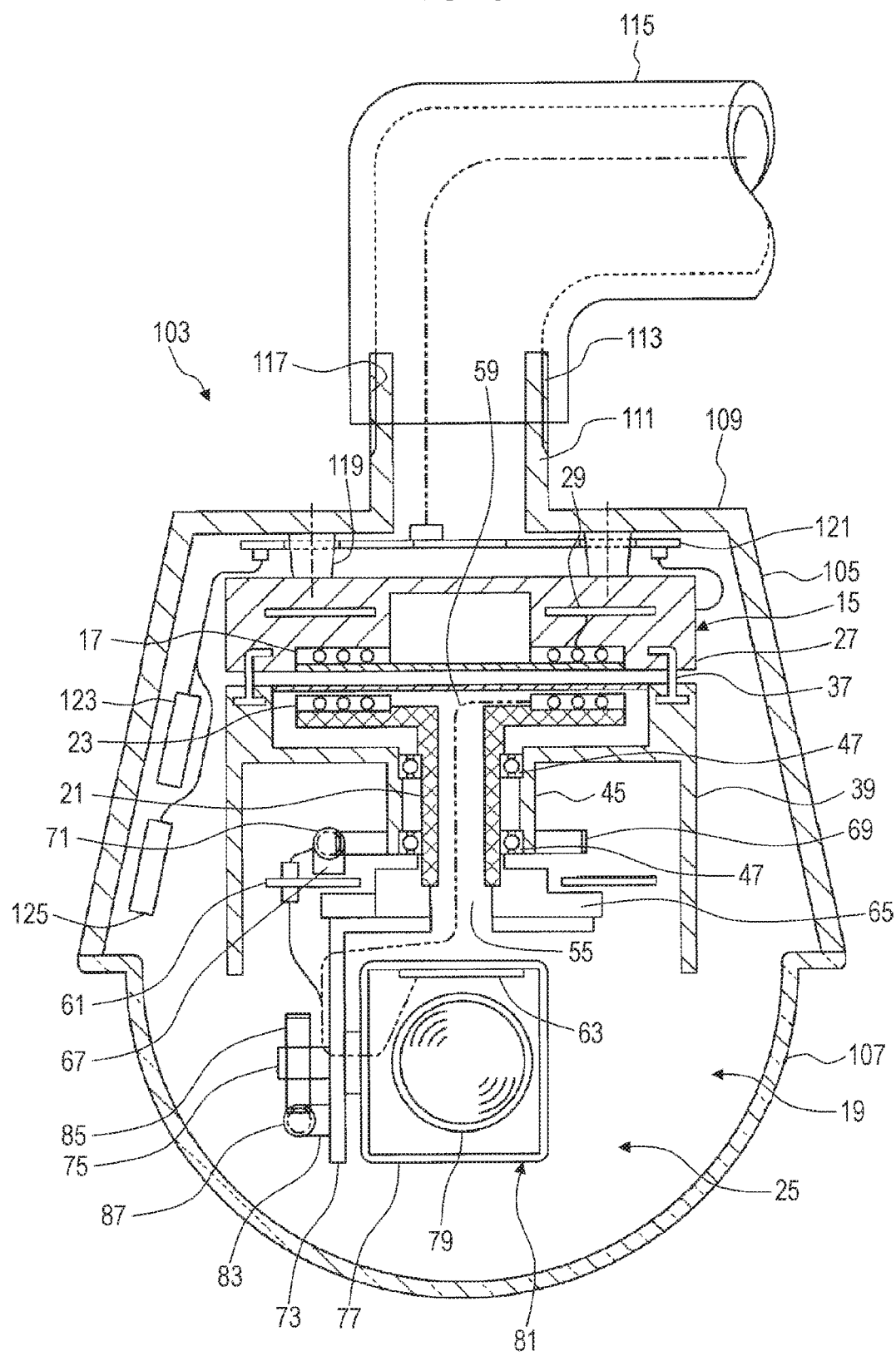
FIG. 5 is a sectional view illustrating an example of a structure of a monitoring camera as an outdoor type using the structure illustrated in FIG. 2.
Figure 6:
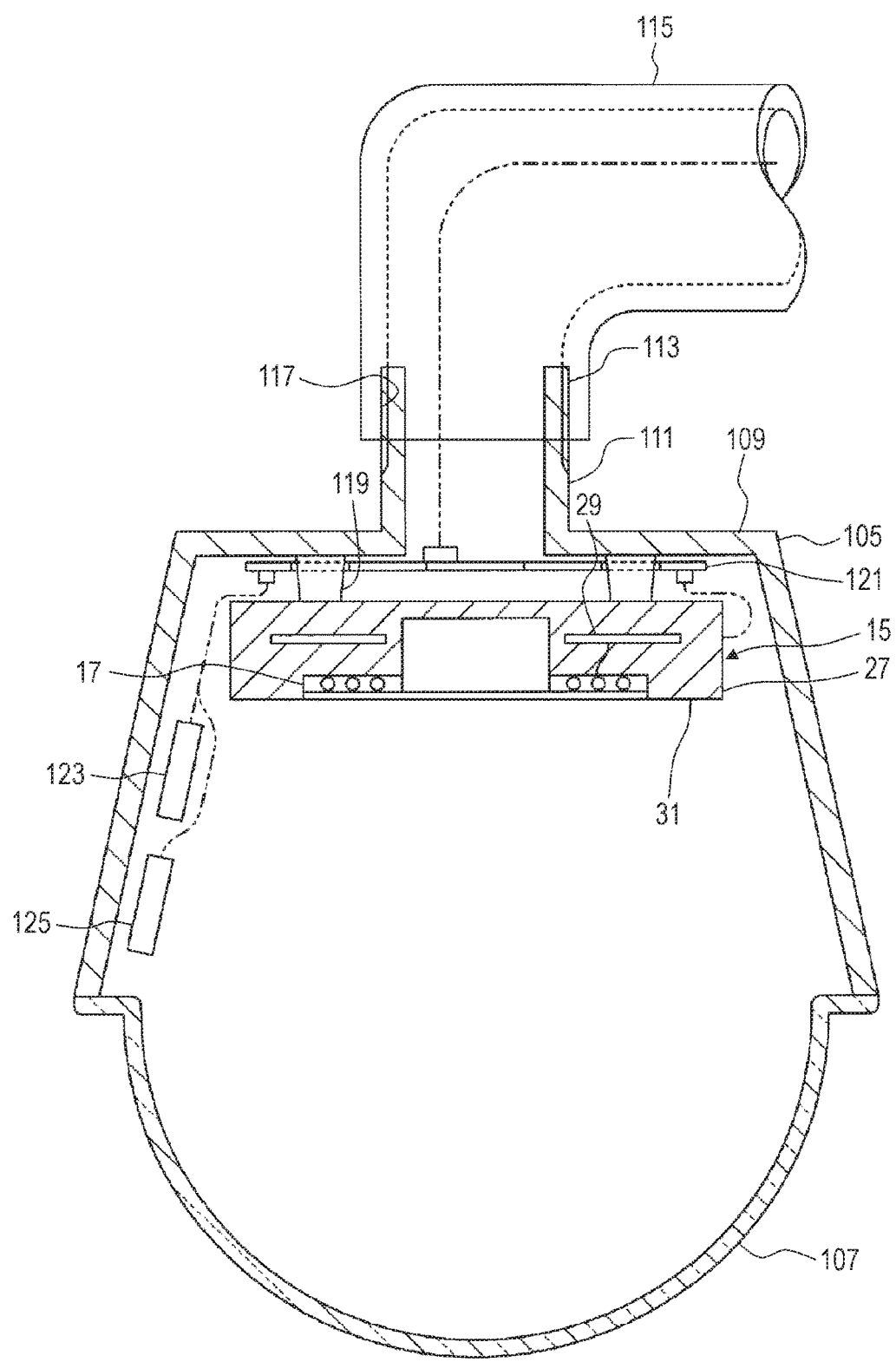
FIG. 6 is a sectional view illustrating a structure of a monitoring camera illustrated in FIG. 5 with the imaging mechanism portion being omitted.
Figure 7:
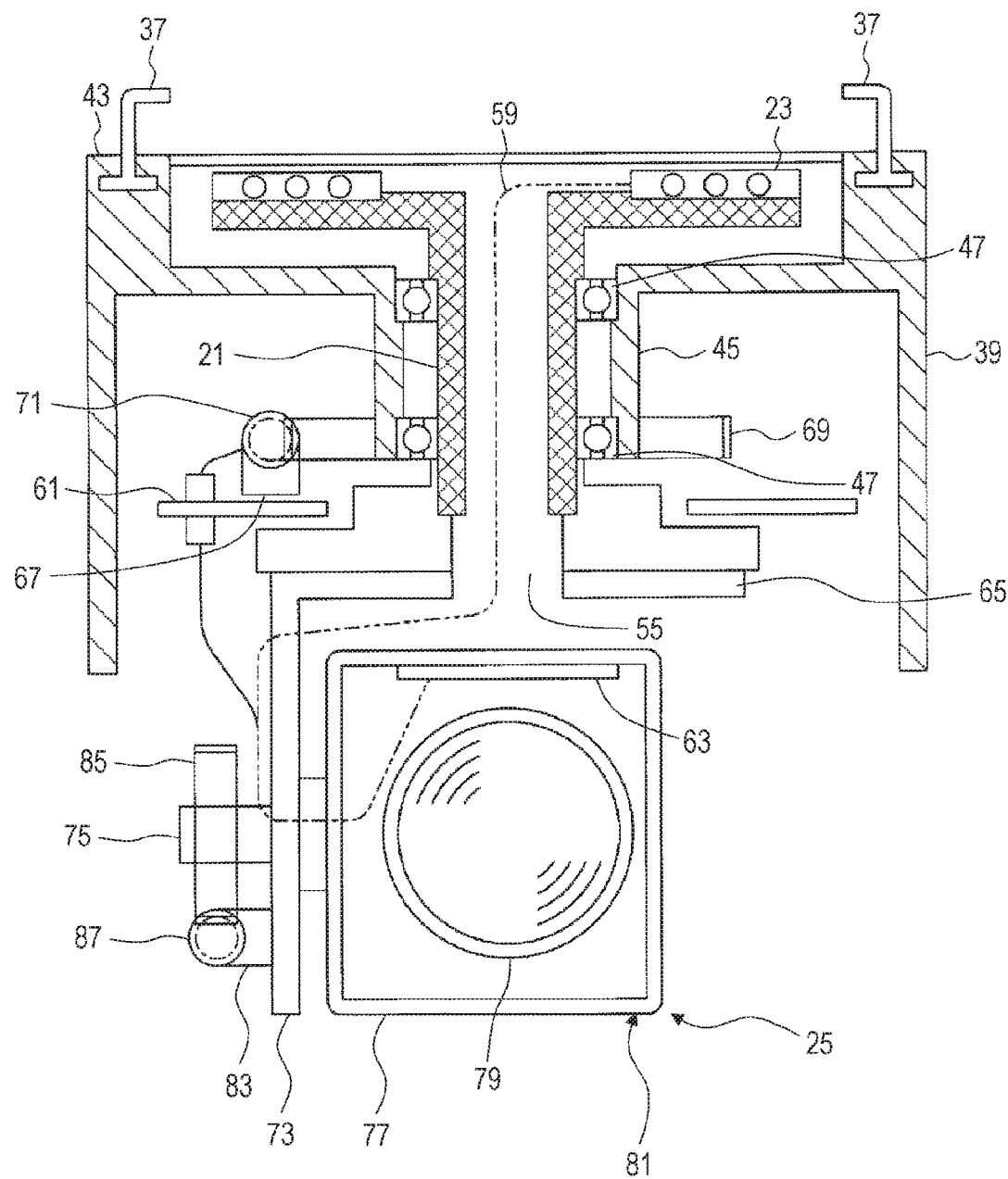
FIG. 7 is a sectional view illustrating a structure of an imaging mechanism portion of the monitoring camera illustrated in FIG. 5.

FIG. 5 is a sectional view illustrating an example of a structure of monitoring camera 103 as an outdoor type using the structure illustrated in FIG. 2. FIG. 6 is a sectional view illustrating monitoring camera 103 with imaging mechanism portion 25 being omitted. FIG. 7 is a sectional view illustrating imaging mechanism portion 25 of monitoring camera 103.

In monitoring camera 103, the watertproofness and the dustproofness are strengthened compared to monitoring camera 13. Monitoring camera 103 includes installation unit 15 of monitoring camera 13 and imaging unit 19. Furthermore, monitoring camera 103 includes a bottomed cylinder type waterproof housing 105 and a translucent waterproof dome cover 107.

In waterproof housing 105, for example, through cylinder portion 111 is formed on bottom plate portion 109 coaxially with axis portion 21. Bottom plate portion 109 becomes a top plate portion when using monitoring camera 103. For example, male screw 113 is formed on the outer periphery of the base end of through cylinder portion 111. Through cylinder portion 111 is mounted by, for example, screwing male screw 113 into female screw 117 of elbow-shaped mounting bracket 115 fixed to support pole.

Plural number of fixed posts 119 protrude to the inside of bottom late portion 109 of waterproof housing 105. Installation unit 15 is fixed to fixed post 119 by the screws or the like. Imaging unit 19 is mounted on installation unit 15 fixed to fixed post 119. Installation unit 15 and imaging unit 19 are covered in a sealed state by waterproof dome cover 107 mounted on waterproof housing 105.

Distribution board 121 is installed between bottom plate portion 109 of waterproof housing 105 and installation unit 15. The electric wires (for example, a power supply line and a signal line) inserted through mounting bracket 115 are connected to distribution board 121. Distribution board 121 is connected to installation unit side board 29. Fan 123 and heater 125 are connected to distribution board 121.

Fan 123 operates, for example, when the temperature in waterproof housing 105 is equal to or higher than a predetermined value, and installation unit 15 and imaging unit 19 are cooled by the blown wind. The electric power is supplied to heater 125, for example, when the temperature in waterproof housing 105 is equal to or lower than a predetermined value, and inside of waterproof housing 105 is heated. In this way, a dew condensation of waterproof dome cover 107 or a freezing of imaging mechanism portion 25 can be suppressed.

According to monitoring camera 103, an outdoor type monitoring camera having the airtight and watertight structure can be obtained by commonly using most of the members in the indoor type monitoring camera 13, and thus, it is possible to strengthen the watertproofness and the dustproofness. In addition, even in a case where the monitoring camera is used in the outdoors owing to the prevention of dew condensation and freezing, a decrease of the image imaged by monitoring camera 103 can be suppressed.

Figure 8:
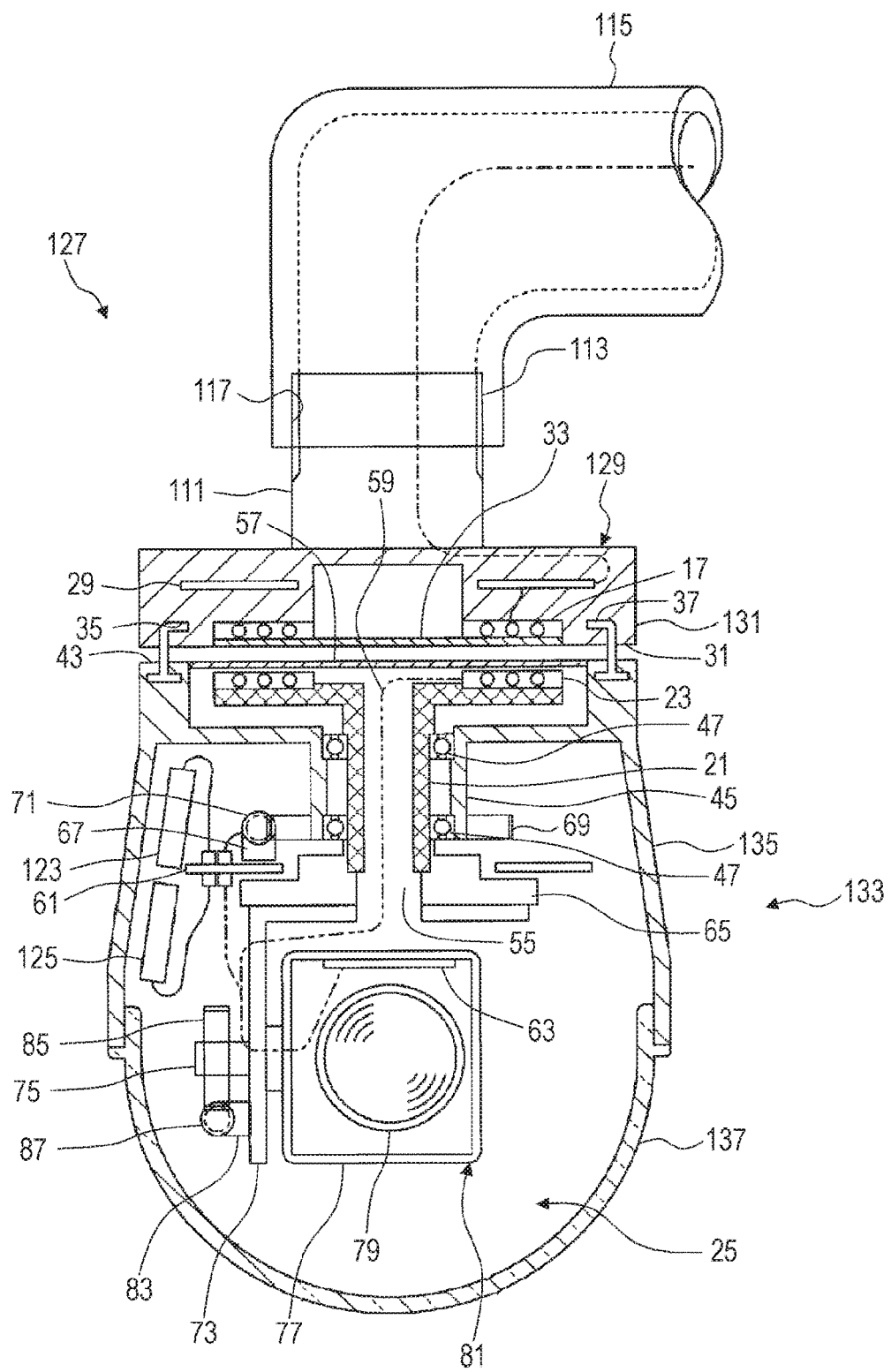
FIG. 8 is a sectional view illustrating an example of a structure of another monitoring camera as an outdoor type using the structure illustrated in FIG. 2.

FIG. 8 is a sectional view illustrating an example of a structure of another monitoring camera 127 as an outdoor type using the structure illustrated in FIG. 2.

In monitoring camera 127, installation unit cover 131 of installation unit 129, imaging unit side cover 135 of imaging unit 133, and dome cover 137 are different from those in monitoring camera 13. In monitoring camera 127, for example, through cylinder portion 111 similar to that described above is formed on installation unit cover 131 coaxially with axis portion 21. Through cylinder portion 111 is mounted by screwing male screw 113 into female screw 117 of the elbow-shaped mounting bracket 115 fixed to the support pole.

Imaging unit side cover 135 covers imaging mechanism portion 25 in a sealed state together with dome cover 137. Fan 123 and heater 125 are connected to motor drive board 61 of imaging mechanism portion 25.

Fan 123 operates when the temperature inside of imaging unit 133 (inside of the waterproof housing) is equal to or higher than a predetermined value, and imaging mechanism portion 25 is cooled by the blown wind. The electric power is supplied to heater 125, for example, when the temperature in imaging unit 133 is equal to or lower than a predetermined value, and inside of imaging unit 133 is heated. In this way, a dew condensation of dome cover 137 or a freezing of imaging mechanism portion 25 can be suppressed.

According to monitoring camera 127, an outdoor type monitoring camera having the airtight and watertight structure can be obtained by commonly using most of the members in the indoor type monitoring camera 13, and thus, it is possible to further strengthen the watertproofness and the dustproofness. Furthermore, for example, monitoring camera 217 can be manufactured by changing the shape of installation unit cover 131, imaging unit side cover 135, and dome cover 137 and by adding fan 123 and heater 125. Therefore, it is possible to manufacture monitoring camera 127 at a cost lower than that of monitoring camera 103.

Therefore, according to the imaging device in the present exemplary embodiment, in the relating rotation portion in which the coils are facing each other, the data transmission can be performed in a non-contact basis, and also in the mounting and removing part of the installation unit and the imaging unit, the electric power source and the signal transmission can be performed in a non-contact basis.

The present invention is not limited to the exemplary embodiment described above, and any configurations can be adopted as long as the functions described in the aspects of the invention or the functions included in the configuration in the present exemplary embodiment can be achieved.

For example, a case is described in the examples, where the central axes of first coil 17 and second coil 23 are coaxial. However, the central axis may not be coaxial as long as at least one of the electric power and the signal can be transmitted and received between first coil 17 and second coil 23. In addition, regarding other members (for example, axis portion 21 and rolling bearing 47), the members may not be necessarily coaxial to have symmetry.

INDUSTRIAL APPLICABILITY

The present invention is useful for an imaging device in which a watertproofness and a dustproofness can be improved, and thus, a long-term reliability can be improved.

REFERENCE MARKS IN THE DRAWINGS 11 central axis
13 monitoring camera
15 installation unit
17 first coil
19 imaging unit
21 axis portion
23 second coil
25 imaging mechanism portion
27 installation unit cover 29 installation unit side board
31 imaging unit facing surface
33 installation unit side sealing lid
35 locking hole
37 locking hook
39 imaging unit side cover
41 translucent dome cover
43 installation unit facing surface
45 cylindrical portion
47 rolling bearing
49 inner ring
51 outer ring
53 ball
55 transmission wire insertion path
57 imaging unit side sealing lid
59 transmission wire
61 motor drive board
63 camera board
65 camera bracket
67 pan axis motor
69 pan axis worm wheel
71 pan axis worm gear
73 camera support plate
75 tilt axis
77 camera
79 lens mechanism
81 camera unit
83 tilt axis motor
85 tilt axis worm wheel
87 tilt axis worm gear
89 monitoring camera
91 first coil board
93 connector
95 hole for electric wire
97 monitoring camera
99 rolling bearing
101 inner ring
103 monitoring camera
105 waterproof housing
107 waterproof dome cover
109 bottom plate portion
111 through cylinder portion
113 male screw
115 mounting bracket
117 female screw
119 fixed post
121 distribution board
123 fan
125 heater
127 monitoring camera
199 installation unit
131 installation unit cover
133 imaging unit
135 imaging unit side cover
137 dome cover
501 monitoring camera
503 camera main body unit
505 fixture
507 main body side coaxial connector
509 fixture side coaxial connector
511 hook
513 hook engaging portion
517 coaxial cable
518 power cord

The invention claimed is:
1. An imaging device comprising:
an imaging unit that images an image; and
a mount on which the imaging unit is detachably mounted,
wherein the mount comprises a first contactless transmitter that transmits and receives at least one of a power and a signal in a non-contact basis, and
wherein the imaging unit comprises:
an axis portion that is rotatably supported by a bearing fixed to the imaging unit,
a second contactless transmitter that is positioned at a first end portion of the axis portion and faces the first contactless transmitter, and transmits and receives at least one of the power and the signal in the non-contact basis, and
a camera that is positioned at a second end of the axis, and is connected to the second contactless transmitter via a transmission wire inserted through the axis portion, the first end being closer to the mount than the second end when the imaging unit is mounted on the mount,
wherein one of the mount and the imaging unit has a locking hook and an other of the mount and the imaging unit has a locking hole which engages with the locking hook.

2. An imaging device comprising:
an imaging unit that images an image; and
a mount on which the imaging unit is detachably mounted,
wherein the mount comprises a first contactless transmitter that transmits and receives at least one of a power and a signal in a non-contact basis, and
wherein the imaging unit comprises:
an axis portion that is rotatably supported by a bearing fixed to the imaging unit;
a second contactless transmitter that is positioned at a first end portion of the axis portion and faces the first contactless transmitter, and transmits and receives at least one of the power and the signal in the non-contact basis; and
a camera that is positioned at a second end of the axis portion, and is connected to the second contactless transmitter via a transmission wire inserted through the axis portion, the first end being closer to the mount than the second end when the imaging unit is mounted on the mount,
wherein the entire bearing is positioned between the second contactless transmitter and the camera in an extending direction of the axis portion,
wherein an outer diameter of the bearing is smaller than an outer diameter of the second contactless transmitter.

3. An imaging device comprising:
an imaging unit that images an image; and
a mount on which the imaging unit is detachably mounted,
wherein the mount comprises a first contactless transmitter that transmits and receives at least one of a power and a signal in a non-contact basis, and
wherein the imaging unit comprises:
an axis portion that is rotatably supported by a bearing fixed to the imaging unit,
a second contactless transmitter that is positioned at a first end portion of the axis portion and faces the first contactless transmitter, and transmits and receives at least one of the power and the signal in the non-contact basis, and
a camera that is positioned at a second end of the axis portion, and is connected to the second contactless transmitter via a transmission wire inserted through the axis portion, the first end being closer to the mount than the second end when the imaging unit is mounted on the mount, wherein an inner diameter of the bearing is larger than an outer diameter of the second contactless transmitter.

4. The imaging device according to claim 1, wherein the locking hook is provided on the imaging device, and the locking hole is provided on the mount.

5. The imaging device according to claim 1, wherein the distance from the axis portion to the second transmitter coil is smaller than the distance from the axis portion to the locking hook.

6. The imaging device according to claim 2, wherein one of the mount and the imaging unit has a locking hook and an other of the mount and the imaging unit has a locking hole which engages with the locking hook.

7. The imaging device according to claim 3, wherein one of the mount and the imaging unit has a locking hook and an other of the mount and the imaging unit has a locking hole which engages with the locking hook.

8. The imaging device according to claim 2, wherein the second contactless transmitter has an annular shape, and the bearing has an annular shape.

9. The imaging device according to claim 3, wherein the second contactless transmitter has an annular shape, and the bearing has an annular shape.

* * * * *